(12) United States Patent
Wong et al.

(10) Patent No.: US 9,799,410 B2
(45) Date of Patent: Oct. 24, 2017

(54) METHOD FOR PROGRAMMING ANTIFUSE-TYPE ONE TIME PROGRAMMABLE MEMORY CELL

(71) Applicant: eMemory Technology Inc., Hsin-Chu (TW)

(72) Inventors: Wei-Zhe Wong, Hsinchu County (TW); Hsin-Ming Chen, Hsinchu (TW)

(73) Assignee: EMEMORY TECHNOLOGY INC., Hsin-Chu (TW)

( * ) Notice: Subject to any disclaimer, the term of this patent is extended or adjusted under 35 U.S.C. 154(b) by 0 days.

(21) Appl. No.: 15/392,348

(22) Filed: Dec. 28, 2016

(65) Prior Publication Data
US 2017/0206980 A1    Jul. 20, 2017

Related U.S. Application Data

(60) Provisional application No. 62/280,137, filed on Jan. 19, 2016.

(51) Int. Cl.
*G11C 17/00* (2006.01)
*G11C 17/18* (2006.01)
*G11C 17/16* (2006.01)

(52) U.S. Cl.
CPC .............. *G11C 17/18* (2013.01); *G11C 17/16* (2013.01)

(58) Field of Classification Search
CPC ................................. G11C 17/18; G11C 17/16
USPC ................................................. 365/96, 225.7
See application file for complete search history.

(56) References Cited

U.S. PATENT DOCUMENTS

| 5,316,971 | A | 5/1994 | Chiang et al. |
| 7,187,228 | B1 | 3/2007 | Jain et al. |
| 7,280,425 | B2* | 10/2007 | Keshavarzi .......... G11C 17/146 365/185.13 |
| 7,885,117 | B2 | 2/2011 | Shin et al. |
| 2006/0291267 | A1 | 12/2006 | Jenne et al. |
| 2009/0237975 | A1 | 9/2009 | Schmitt et al. |
| 2010/0165699 | A1* | 7/2010 | Chen .................... G11C 17/18 365/96 |
| 2012/0039107 | A1 | 2/2012 | Chung |
| 2013/0010518 | A1 | 1/2013 | Lu et al. |
| 2014/0098591 | A1 | 4/2014 | Chen et al. |
| 2014/0293673 | A1 | 10/2014 | Wu et al. |
| 2014/0340955 | A1 | 11/2014 | Wu et al. |

OTHER PUBLICATIONS

European Patent Office "Search Report" dated Jun. 22, 2017, EPO.

* cited by examiner

*Primary Examiner* — Huan Hoang
(74) *Attorney, Agent, or Firm* — WPAT, PC

(57) ABSTRACT

A method for programming an antifuse-type OTP memory cell is provided. Firstly, a first program voltage is provided to a gate terminal of an antifuse transistor. A first bit line voltage is transmitted to the antifuse transistor. A first voltage stress with a first polarity is provided to a gate oxide layer of the antifuse transistor to form a weak path between the gate terminal and the first drain/source terminal of the antifuse transistor. Secondly, a second program voltage is provided to the gate terminal of the antifuse transistor. A second bit line voltage is transmitted to the antifuse transistor. A second voltage stress with a second polarity is provided to the gate oxide layer of the antifuse transistor. Consequently, a program current is generated along the weak path to rupture the gate oxide layer above the first drain/source terminal.

9 Claims, 7 Drawing Sheets

METHOD FOR PROGRAMMING ANTIFUSE-TYPE ONE TIME PROGRAMMABLE MEMORY CELL

This application claims the benefit of U.S. provisional application Ser. No. 62/280,137, filed Jan. 19, 2016, the disclosure of which is incorporated by reference herein in its entirety.

FIELD OF THE INVENTION

The present invention relates to a method for programming a non-volatile memory cell, and more particularly to a method for programming an antifuse-type one time programmable memory cell.

BACKGROUND OF THE INVENTION

As is well known, a non-volatile memory is able to continuously retain data after the supplied power is interrupted. Generally, after the non-volatile memory leaves the factory, the user may program the non-volatile memory in order to record data into the non-volatile memory.

According to the number of times the non-volatile memory is programmed, the non-volatile memories may be classified into a multi-time programmable memory (also referred as a MTP memory), a one time programmable memory (also referred as an OTP memory) and a mask read only memory (also referred as a Mask ROM).

Generally, the MTP memory can be programmed many times, and the stored data of the MTP memory can be modified many times. On the contrary, the OTP memory can be programmed once. After the OTP memory is programmed, the stored data cannot be modified. Moreover, after the Mask ROM leaves the factory, all stored data have been recorded therein. The user is only able to read the stored data from the Mask ROM, but is unable to program the Mask ROM.

Moreover, depending on the characteristics, the OTP memories may be classified into two types, i.e. a fuse-type OTP memory and an antifuse-type OTP memory. Before a memory cell of the fuse-type OTP memory is programmed, the memory cell has a low-resistance storage state. After the memory cell of the fuse-type OTP memory is programmed, the memory cell has a high-resistance storage state.

On the other hand, the memory cell of the antifuse-type OTP memory has the high-resistance storage state before programmed, and the memory cell of the antifuse-type OTP memory has the low-resistance storage state after programmed.

SUMMARY OF THE INVENTION

An embodiment of the present invention provides a method for programming an antifuse-type one time programmable memory cell. The antifuse-type one time programmable memory cell includes a first control transistor and a first antifuse transistor. The first control transistor includes a gate terminal, a first drain/source terminal and a second drain/source terminal. The first antifuse transistor includes a gate terminal and a first drain/source terminal. The first drain/source terminal of the first antifuse transistor is connected with the second drain/source terminal of the first control transistor. The method includes the following steps. In a step (a), a first program voltage is provided to the gate terminal of the first antifuse transistor, and the first control transistor is turned on. A first bit line voltage is transmitted from the first drain/source terminal of the first control transistor to the first drain/source terminal of the first antifuse transistor. A first voltage stress with a first polarity is provided to a gate oxide layer of the first antifuse transistor. A weak path is formed between the gate terminal of the first antifuse transistor and the first drain/source terminal of the first antifuse transistor. In a step (b), a second program voltage is provided to the gate terminal of the first antifuse transistor, and the first control transistor is turned on. A second bit line voltage is transmitted from the first drain/source terminal of the first control transistor to the first drain/source terminal of the first antifuse transistor. A second voltage stress with a second polarity is provided to the gate oxide layer of the first antifuse transistor. A program current is generated along the weak path. Consequently, the gate oxide layer of the first antifuse transistor is ruptured.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1A:
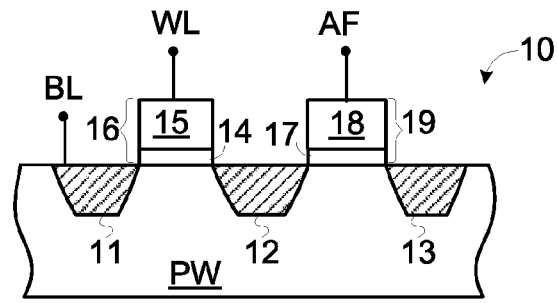
FIG. 1A is a schematic cross-sectional view of an antifuse-type one time programmable memory cell according to an embodiment of the present invention.
Figure 1B:
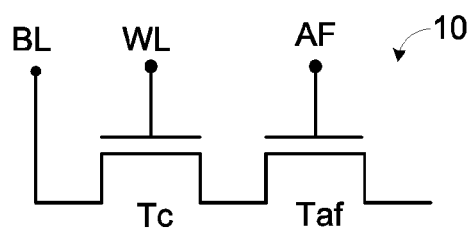
FIG. 1B is a schematic equivalent circuit diagram of the antifuse-type one time programmable memory cell according to the embodiment of the present invention.

FIG. 1A is a schematic cross-sectional view of an antifuse-type one time programmable memory cell according to an embodiment of the present invention. FIG. 1B is a schematic equivalent circuit diagram of the antifuse-type one time programmable memory cell according to the embodiment of the present invention. For brevity, the antifuse-type one time programmable memory cell is also referred as an OTP memory cell.

As shown in FIG. 1A, the OTP memory cell 10 is constructed in a P-well region PW. A first doped region 11, a second doped region 12 and a third doped region 13 are formed under a top surface of the P-well region PW. The first doped region 11 is connected with a bit line BL.

A first gate structure 16 is formed on the top surface of the P-well region PW and disposed over the region between the first doped region 11 and the second doped region 12. A second gate structure 19 is formed on the top surface of the P-well region PW and disposed over the region between the second doped region 12 and the third doped region 13. The first gate structure 16 comprises a first gate oxide layer 14 and a first gate 15. The first gate 15 is connected with a word line WL. The second gate structure 19 comprises a second gate oxide layer 17 and a second gate 18. The second gate 18 is connected with an antifuse control line AF.

The first doped region 11, the second doped region 12 and the first gate structure 16 are collaboratively formed as a control transistor Tc. The second doped region 12, the third doped region 13 and the second gate structure 19 are collaboratively formed as an antifuse transistor Taf.

Please refer to FIG. 1B. A first drain/source terminal of the control transistor Tc is connected with the bit line BL. A gate terminal of the control transistor Tc is connected with the word line WL. A first drain/source terminal of the antifuse transistor Taf is connected with a second drain/source terminal of the control transistor Tc. A gate terminal of the antifuse transistor Taf is connected with the antifuse control line AF.

FIGS. 2A-2D schematically illustrate associated voltage signals for programming and reading the OTP memory cell according to the embodiment of the present invention.

Figure 2A:
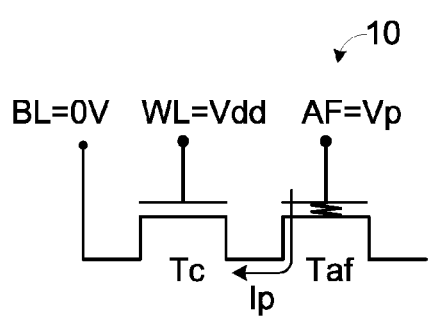
FIGS. 2A-2D schematically illustrate associated voltage signals for programming and reading the OTP memory cell according to the embodiment of the present invention.

Please refer to FIG. 2A. For programming the OTP memory cell to a first storing state, a ground voltage (e.g., 0V) is provided to the bit line BL, a control voltage Vdd is provided to the word line WL, and a program voltage Vp is provided to the antifuse control line AF. In an embodiment, the magnitude of the control voltage Vdd is in the range between 0.75V and 3.6V, and the program voltage Vp is in the range between 4V and 11V.

Since the control voltage Vdd is provided to the word line WL and the ground voltage (e.g., 0V) is provided to the bit line BL, the control transistor Tc is turned on. Meanwhile, the ground voltage (e.g., 0V) is transmitted to the antifuse transistor Taf through the control transistor Tc. In addition, the voltage stress of the program voltage Vp is applied to the gate oxide layer of the antifuse transistor Taf. Since the program voltage Vp is beyond the withstanding voltage range of the antifuse transistor Taf, a program current Ip is outputted from the antifuse transistor Taf. The program current Ip flows to the bit line BL through the control transistor Tc.

Moreover, due to the program current Ip, the gate oxide layer of the antifuse transistor Taf is ruptured. The ruptured gate oxide layer may be considered as a resistor with a low resistance value. In other words, the antifuse transistor Taf connected with the control transistor Tc is considered as a low-resistance resistor. Under this circumstance, the OTP memory cell 10 is in the first storing state.

Figure 2B:
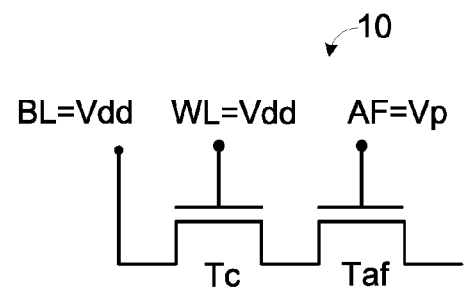

Please refer to FIG. 2B. For programming the OTP memory cell 10 to a second storing state, the control voltage Vdd is provided to the bit line BL, the control voltage Vdd is provided to the word line WL, and the program voltage Vp is provided to the antifuse control line AF.

Since the control voltage Vdd is provided to the word line WL and the bit line BL, the control transistor Tc is turned off. Since the control transistor Tc is turned off, the gate oxide layer of the antifuse transistor Taf is not ruptured. The gate oxide layer that is not ruptured may be considered as a resistor with a high resistance value of several mega ohms.

Since the gate oxide layer is not ruptured, the OTP memory cell 10 does not generate the program current. In other words, the antifuse transistor Taf connected with the control transistor Tc is considered as a high-resistance resistor. Under this circumstance, the OTP memory cell 10 is in the second storing state.

During the read cycle, the ground voltage (e.g., 0V) is provided to the bit line BL, the control voltage Vdd is provided to the word line WL, and a read voltage Vread is provided to the antifuse control line AF. According to the magnitude of a read current flowing through the bit line BL, the OTP memory cell 10 is verified to have the first storing state or the second state. In an embodiment, the magnitude of the read voltage Vread is in the range between 0.75V and 3.6V.

Figure 2C:
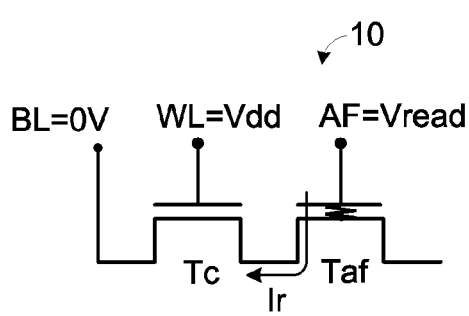

Please refer to FIG. 2C. In this situation, the OTP memory cell 10 is in the first storing state. When the control transistor Tc is turned on in response to the control voltage Vdd, the antifuse transistor Taf generates a read current Ir in response to the read voltage Vread. The read current Ir flows to the bit line BL through the control transistor Tc, and the magnitude of the read current Ir is several microamperes (μA).

Figure 2D:
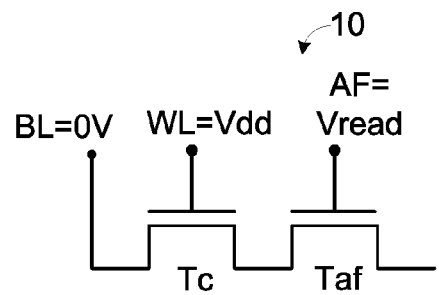

Please refer to FIG. 2D. In this situation, the OTP memory cell 10 is in the second storing state. When the control transistor Tc is turned on in response to the control voltage Vdd, the antifuse transistor Taf generates a read current Ir in response to the read voltage Vread. The magnitude of the read current Ir flowing through the bit line BL is nearly zero (or much lower than 1 μA).

In other words, during the read cycle, the OTP memory cell 10 is judged to have the first storing state or the second storing state according to the magnitude of the read current flowing through the bit line BL.

However, due to the process variation, some problems occur. For example, when the voltage stress of the program voltage Vp is applied to the gate oxide layer of the antifuse transistor Taf, the ruptured position of the gate oxide layer is somewhat different. Consequently, the magnitude of the read current Ir is different.

Figure 3A:
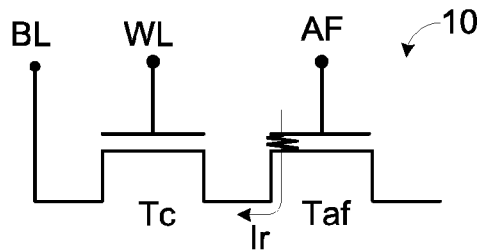
FIGS. 3A-3C schematically illustrate different ruptured positions of the gate oxide layer of the antifuse transistor.
Figure 3B:
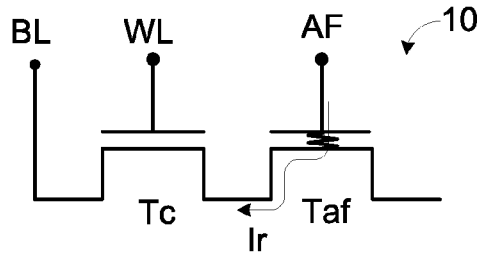
Figure 3C:
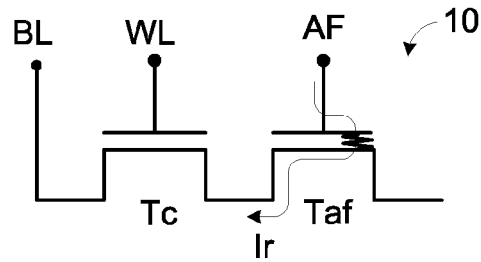

FIGS. 3A-3C schematically illustrate different ruptured positions of the gate oxide layer of the antifuse transistor.

Please refer to FIG. 3A. After the program action is completed, the ruptured position of the gate oxide layer is located between the gate terminal of the antifuse transistor Taf and the first drain/source terminal of the antifuse transistor Taf. Under this circumstance, the resistor between the gate terminal of the antifuse transistor Taf and the first drain/source terminal of the antifuse transistor Taf has the lowest resistance. Consequently, the read current Ir has the largest current value during the read cycle.

Due to the process variation, the ruptured position of the gate oxide layer as shown in FIG. 3B and the ruptured position of the gate oxide layer as shown in FIG. 3C are possible. As shown in FIG. 3B, the ruptured position of the gate oxide layer is located between the gate terminal of the antifuse transistor Taf and the channel of the antifuse transistor Taf. As shown in FIG. 3C, the ruptured position of the gate oxide layer is located between the gate terminal of the antifuse transistor Taf and the second drain/source terminal of the antifuse transistor Taf.

In case that the situation of FIG. 3B or the situation of FIG. 3C occurs, the resistor between the gate terminal of the antifuse transistor Taf and the first drain/source terminal of the antifuse transistor Taf has a higher resistance. Consequently, the read current Ir has the smaller current value during the read cycle. If the read current Ir is too small, the OTP memory cell is possibly misjudged as the second storing state.

Figure 3D:
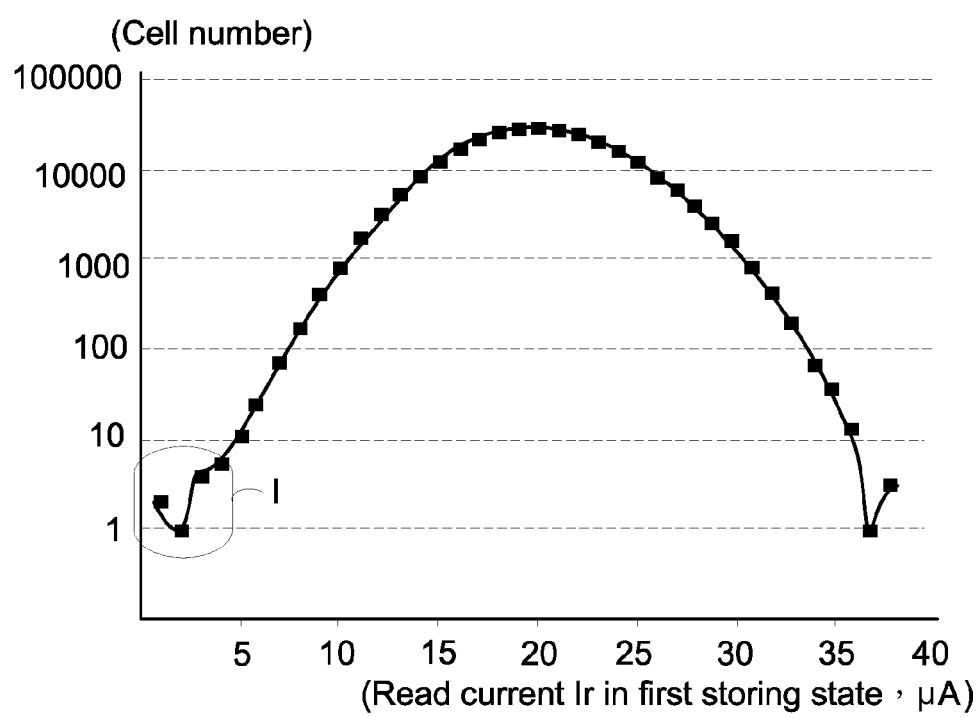
FIG. 3D is a plot illustrating the relationship between the number of OTP memory cells in the first storing state and the read current.

FIG. 3D is a plot illustrating the relationship between the number of OTP memory cells in the first storing state and the read current. After the OTP memory cells are programmed to the first storing state, a small amount of OTP memory cells still have smaller read currents. For example, the read current Ir of the OTP memory cells circumscribed by the dotted frame I is smaller than 5 µA. These OTP memory cell is possibly misjudged as the second storing state.

As mentioned above, the read current Ir of the OTP memory cells circumscribed by the dotted frame I is very low. That reason may be that the ruptured position of the gate oxide layer of the antifuse transistor Taf is not optimal during the program cycle.

For solving the above drawbacks, the present invention provides a novel method for programming the OTP memory cell. During the program cycle, the OTP memory cell is programmed to the first storing state in two stages. In the first stage of the program cycle, a voltage stress with a first polarity is provided to the region between the gate terminal of the antifuse transistor Taf and the first drain/source terminal of the antifuse transistor Taf. Consequently, a weak path is formed between the gate terminal of the antifuse transistor Taf and the first drain/source terminal of the antifuse transistor Taf. In other words, under the above bias condition of the first stage, there will be a localized oxide damage region generated in the gate oxide layer of the antifuse Taf to form the weak path. In addition, a weak current in a first direction is generated in the weak path. The weak current in the first direction flows from the first drain/source terminal of the antifuse transistor Taf to the gate terminal of the antifuse transistor Taf.

In the second stage of the program cycle, a voltage stress with a second polarity is provided to the region across the gate oxide layer of the antifuse transistor Taf. Consequently, a program current in a second direction is generated. Because of the pre-established weak path during the first stage of the program cycle, the program current in the second direction flows along the weak path, and flows from the gate terminal of the antifuse transistor Taf to the first drain/source terminal of the antifuse transistor Taf. Consequently, the gate oxide layer of the antifuse transistor Taf is ruptured.

After the two stages of the program cycle are completed, the OTP memory cell is programmed to the first storing state. Moreover, it is confirmed that the ruptured position of the gate oxide layer is located between the gate terminal of the antifuse transistor Taf and the first drain/source terminal of the antifuse transistor Taf.

Figure 4A:
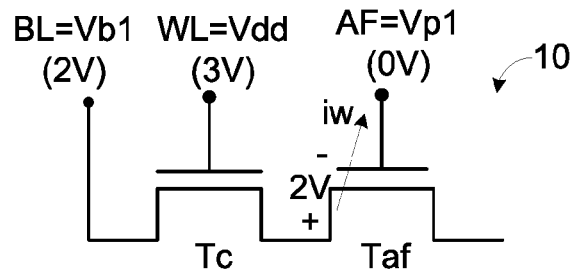
FIG. 4A schematically illustrates associated voltage signals for programming the OTP memory cell to the first storing state in the first stage of the program cycle.

FIG. 4A schematically illustrates associated voltage signals for programming the OTP memory cell to the first storing state in the first stage of the program cycle. For example, the nominal voltage of the antifuse transistor Taf is 1.5V. In the first stage of the program cycle, a bit line voltage Vb1 is provided to the bit line BL, a control voltage Vdd is provided to the word line WL, and a program voltage Vp1 is provided to the antifuse control line AF. In an embodiment, the control voltage Vdd is 3V, the bit line voltage Vb1 is 2V, and the program voltage Vp1 is 0V. That is, the bit line voltage Vb1 is higher than the program voltage Vp1.

Since the control transistor Tc is turned on, the bit line voltage Vb1 (2V) is transmitted from the first drain/source terminal of the control transistor Tc to the first drain/source terminal of the antifuse transistor Taf through the control transistor Tc. Consequently, the voltage at the gate terminal of the antifuse transistor Taf is lower than the voltage at the first drain/source terminal of the antifuse transistor Taf. Meanwhile, the antifuse transistor Taf is turned off, and thus the channel cannot be formed. Under this circumstance, a voltage stress with the negative polarity (−2V) is provided to the region between the gate terminal of the antifuse transistor Taf and the first drain/source terminal of the antifuse transistor Taf.

Since the voltage stress with the negative polarity (−2V) is slightly beyond the nominal voltage of the antifuse transistor Taf (e.g., 1.5V), the gate oxide layer of the antifuse transistor Taf is not ruptured. However, because of a band-to-band hot hole injection effect and a weak edge tunneling effect, the weak path is formed between the gate terminal of the antifuse transistor Taf and the first drain/source terminal of the antifuse transistor Taf. In addition, the weak current iw in the first direction flows through the weak path. The weak current iw in the first direction flows from the first drain/source terminal of the antifuse transistor Taf to the gate terminal of the antifuse transistor Taf.

Figure 4B:
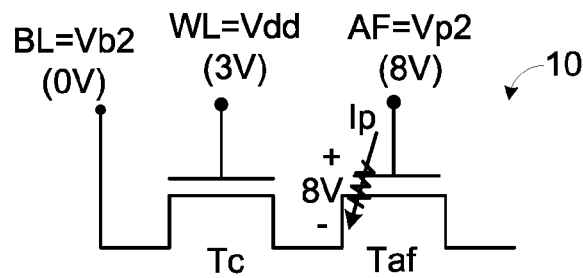
FIG. 4B schematically illustrates associated voltage signals for programming the OTP memory cell to the first storing state in the second stage of the program cycle.

FIG. 4B schematically illustrates associated voltage signals for programming the OTP memory cell to the first storing state in the second stage of the program cycle. In the second stage of the program cycle, a bit line voltage Vb2 is provided to the bit line BL, the control voltage Vdd is provided to the word line WL, and a program voltage Vp2 is provided to the antifuse control line AF. In an embodiment, the bit line voltage Vb2 is 0V, and the program voltage Vp2 is 8V. That is, the program voltage Vp2 is higher than the bit line voltage Vb1, and the bit line voltage Vb1 is higher than the bit line voltage Vb2.

Since the control transistor Tc is turned on, the bit line voltage Vb2 (e.g., 0V) is transmitted from the first drain/source terminal of the control transistor Tc to the first drain/source terminal of the antifuse transistor Taf through the control transistor Tc. Consequently, the voltage at the gate terminal of the antifuse transistor Taf is higher than the voltage at the first drain/source terminal of the antifuse transistor Taf. Under this circumstance, a voltage stress with the positive polarity (+8V) is provided to the region across the gate oxide layer of the antifuse transistor Taf.

Since the voltage stress with the positive polarity (+8V) is largely beyond the withstanding voltage of the antifuse transistor Taf, a program current Ip with the higher magnitude is generated. The program current Ip flows along the pre-established weak path. Consequently, the gate oxide layer of the antifuse transistor Taf is ruptured. Moreover, the program current Ip flows in a second direction. That is, the program current Ip flows from the gate terminal of the antifuse transistor Taf to the first drain/source terminal of the antifuse transistor Taf.

After the two stages of the program cycle are completed, the OTP memory cell is programmed to the first storing state. Moreover, it is confirmed that the ruptured position of the gate oxide layer is arranged between the gate terminal of the antifuse transistor Taf and the first drain/source terminal of the antifuse transistor Taf.

Figure 4C:
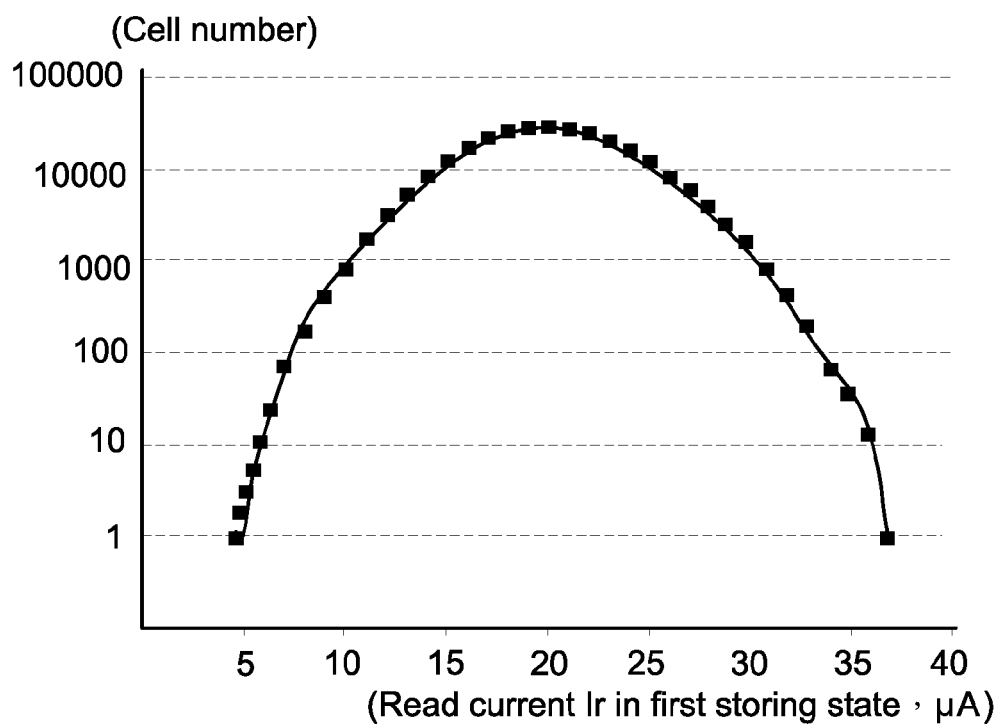
FIG. 4C is a plot illustrating the relationship between the number of OTP memory cells in the first storing state and the read current, in which the program cycle is divided into two stages.

FIG. 4C is a plot illustrating the relationship between the number of OTP memory cells in the first storing state and the read current, in which the program cycle is divided into two stages. After plural OTP memory cells are programmed to the first storing state, the read currents Ir for almost all of OTP memory cells are not smaller than 5 µA. Consequently, the possibility of misjudging the storing states of OTP memory cells is largely reduced.

Figure 5:
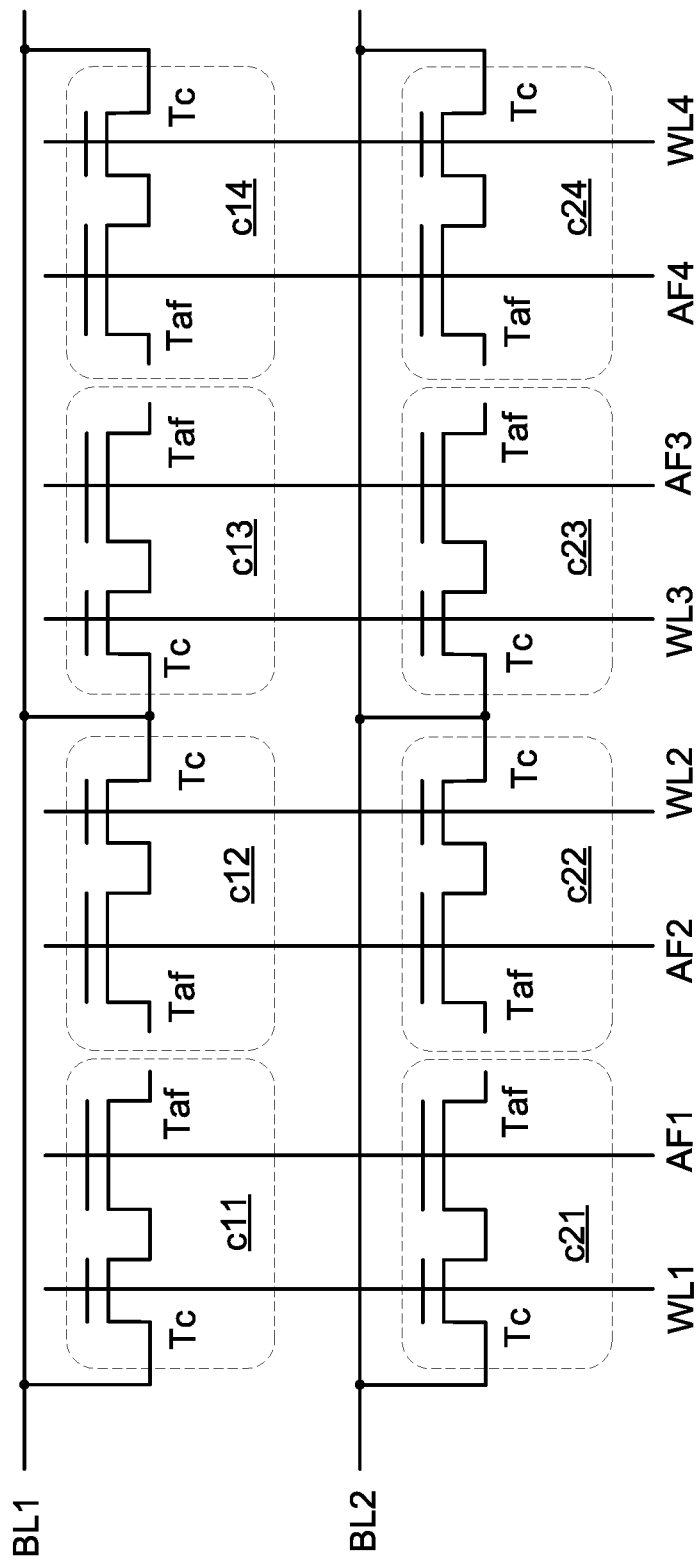
FIG. 5 is a schematic equivalent circuit diagram of a memory array with the OTP memory cells of the present invention.

FIG. 5 is a schematic equivalent circuit diagram of a memory array with the OTP memory cells of the present invention. As shown in FIG. 5, the memory array comprises OTP memory cells c11~c24 in a 2×4 array. Each OTP memory cell comprises a control transistor Tc and an antifuse transistor Taf. The OTP memory cells c11~c14 in the first row are connected with a bit line BL1. The OTP memory cells c21~c24 in the second row are connected with a bit line BL2. The OTP memory cells c11 and c21 are connected with a word line WL1 and an antifuse control line AF1. The OTP memory cells c12 and c22 are connected with a word line WL2 and an antifuse control line AF2. The OTP memory cells c13 and c23 are connected with a word line WL3 and an antifuse control line AF3. The OTP memory cells c14 and c24 are connected with a word line WL4 and an antifuse control line AF4.

Take the OTP memory cell c13 as an example. A method of programming the OTP memory cell c13 to the first storing state will be described as follows.

For programming the OTP memory cell c13, the bit line BL1 is a selected bit line, the word line WL3 is a selected word line, and the antifuse control line AF3 is a selected antifuse control line.

Figure 6A:
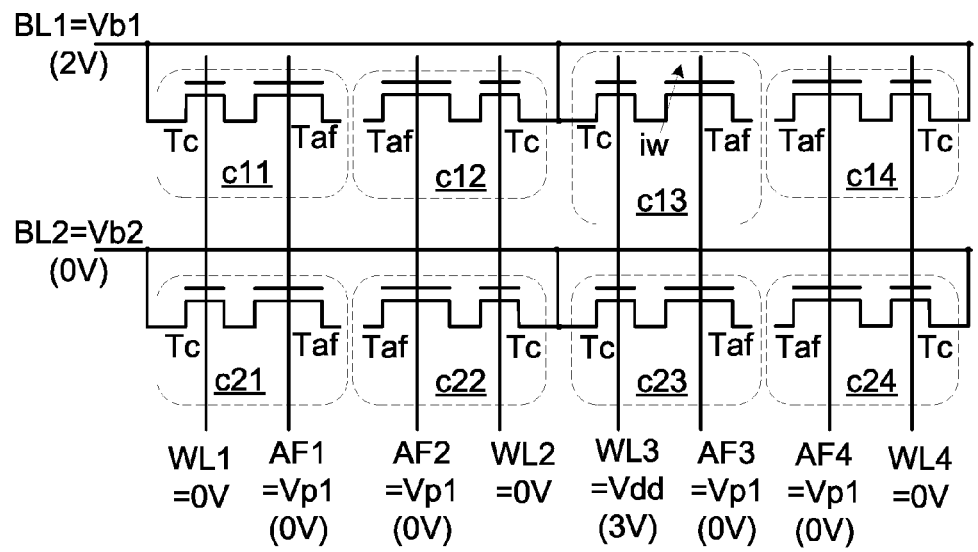
FIG. 6A schematically illustrates associated voltage signals for programming the OTP memory cell of the memory array of FIG. 5 to the first storing state in the first stage of the program cycle.

FIG. 6A schematically illustrates associated voltage signals for programming the OTP memory cell of the memory array of FIG. 5 to the first storing state in the first stage of the program cycle. During the first stage of the program cycle, the bit line voltage Vb1 (e.g., 2V) is provided to the bit line BL1, the control voltage Vdd (e.g., 3V) is provided to the word line WL3, and the program voltage Vp1 (e.g., 0V) is provided to the antifuse control line AF3. Moreover, the bit line voltage Vb2 (e.g., 0V) is provided to the non-selected bit line BL2, an off voltage (e.g., 0V) is provided to the non-selected word lines WL1, WL2 and WL4, and the program voltage Vp1 (e.g., 0V) is provided to the non-selected antifuse control lines AF1, AF2 and AF4.

Under this circumstance, a voltage stress with the negative polarity (−2V) is provided to the region between the gate terminal and the first drain/source terminal of the antifuse transistor Taf of the OTP memory cell c13. Moreover, a weak path is formed between the gate terminal of the antifuse transistor Taf and the first drain/source terminal of the antifuse transistor Taf. In other words, under the above bias condition of the first stage, there will be a localized oxide damage region generated in the gate oxide layer of the antifuse Taf to form the weak path. In addition, a weak current iw in the first direction flows from the first drain/source terminal of the antifuse transistor Taf to the gate terminal of the antifuse transistor Taf.

Figure 6B:
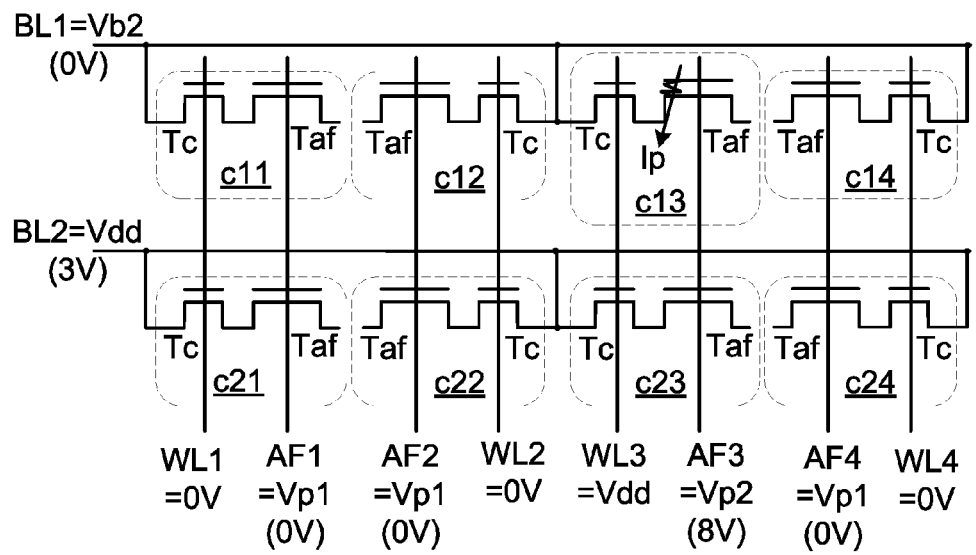
FIG. 6B schematically illustrates associated voltage signals for programming the OTP memory cell of the memory array of FIG. 5 to the first storing state in the second stage of the program cycle.

FIG. 6B schematically illustrates associated voltage signals for programming the OTP memory cell of the memory array of FIG. 5 to the first storing state in the second stage of the program cycle. During the second stage of the program cycle, the bit line voltage Vb2 (e.g., 0V) is provided to the bit line BL1, the control voltage Vdd (e.g., 3V) is provided to the word line WL3, and the program voltage Vp2 (e.g., 8V) is provided to the antifuse control line AF3. Moreover, the control voltage Vdd (e.g., 3V) is provided to the non-selected bit line BL2, the off voltage (e.g., 0V) is provided to the non-selected word lines WL1, WL2 and WL4, and the program voltage Vp1 (e.g., 0V) is provided to the non-selected antifuse control lines AF1, AF2 and AF4.

Under this circumstance, a voltage stress with the positive polarity (+8V) is provided to the region across the gate oxide layer of the antifuse transistor Taf of the OTP memory cell c13. Moreover, a program current Ip flows in a second direction is generated by the antifuse transistor Taf. The program current Ip flows along the pre-established weak path. That is, the program current Ip flows from the gate terminal of the antifuse transistor Taf to the first drain/source terminal of the antifuse transistor Taf. Consequently, the gate oxide layer of the antifuse transistor Taf is ruptured.

After the two stages of the program cycle are completed, the OTP memory cell is programmed to the first storing state. Moreover, it is confirmed that the ruptured position of the gate oxide layer is arranged between the gate terminal of the antifuse transistor Taf and the first drain/source terminal of the antifuse transistor Taf.

The method of programming the OTP memory cell to the first storing state in two stages can be applied to the other types of OTP memory cells.

Figure 7A:
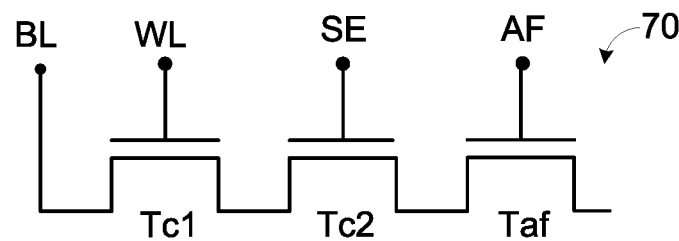
FIG. 7A is a schematic equivalent circuit diagram of an antifuse-type one time programmable memory cell according to another embodiment of the present invention.

FIG. 7A is a schematic equivalent circuit diagram of an antifuse-type one time programmable memory cell according to another embodiment of the present invention. As shown in FIG. 7A, the OTP memory cell 70 comprises a control transistor Tc1, a control transistor Tc2 and an antifuse transistor Taf. A first drain/source terminal of the control transistor Tc1 is connected with a bit line BL. A gate terminal of the control transistor Tc1 is connected with the word line WL. A first drain/source terminal of the control transistor Tc2 is connected with a second drain/source terminal of the control transistor Tc1. A gate terminal of the control transistor Tc2 is connected with a select line SE. A first drain/source terminal of the antifuse transistor Taf is connected with a second drain/source terminal of the control transistor Tc2. A gate terminal of the antifuse transistor Taf is connected with the antifuse control line AF.

Figure 7B:
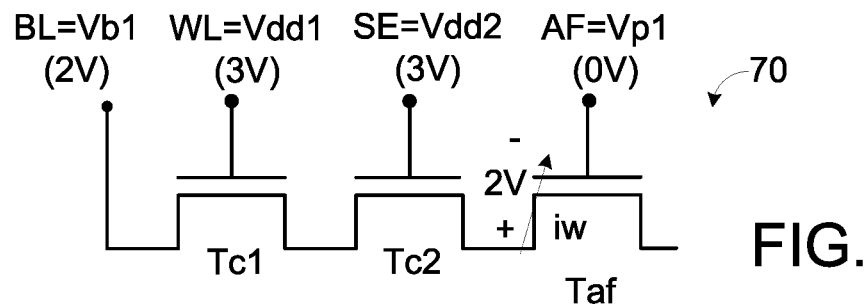
FIG. 7B schematically illustrates associated voltage signals for programming the OTP memory cell FIG. 7A to the first storing state in the first stage of the program cycle.

FIG. 7B schematically illustrates associated voltage signals for programming the OTP memory cell FIG. 7A to the first storing state in the first stage of the program cycle. In the first stage of the program cycle, a bit line voltage Vb1 is provided to the bit line BL, a control voltage Vdd1 is provided to the word line WL, a control voltage Vdd2 is provided to the select line SE, and a program voltage Vp1 is provided to the antifuse control line AF. In an embodiment, the control voltage Vdd1 is 3V, the control voltage Vdd2 is 3V, the bit line voltage Vb1 is 2V, and the program voltage Vp1 is 0V. The bit line voltage Vb1 is higher than the program voltage Vp1. The control voltage Vdd2 is higher than or equal to the control voltage Vdd1.

Since the control transistor Tc1 and the control transistor Tc2 are turned on, the bit line voltage Vb1 (2V) is transmitted from the first drain/source terminal of the control transistor Tc1 to the first drain/source terminal of the antifuse transistor Taf through the control transistor Tc1 and the control transistor Tc2. Consequently, the voltage at the gate terminal of the antifuse transistor Taf is lower than the voltage at the first drain/source terminal of the antifuse transistor Taf. Meanwhile, the antifuse transistor Taf is turned off, and thus the channel cannot be formed. Under this circumstance, a voltage stress with the negative polarity (−2V) is provided to the region between the gate terminal of the antifuse transistor Taf and the first drain/source terminal of the antifuse transistor Taf.

Since the voltage stress with the negative polarity (−2V) is slightly beyond the nominal voltage of the antifuse transistor Taf (e.g., 1.5V), the gate oxide layer of the antifuse transistor Taf is not ruptured. However, a weak path is formed between the gate terminal of the antifuse transistor Taf and the first drain/source terminal of the antifuse transistor Taf. In other words, under the above bias condition of the first stage, there will be a localized oxide damage region generated in the gate oxide layer of the antifuse Taf to form the weak path. In addition, a weak current iw in a first direction flows through the weak path. The weak current iw flows from the first drain/source terminal of the antifuse transistor Taf to the gate terminal of the antifuse transistor Taf.

Figure 7C:
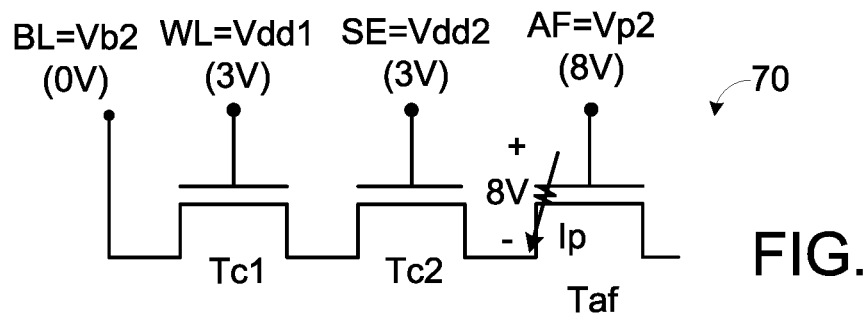
FIG. 7C schematically illustrates associated voltage signals for programming the OTP memory cell FIG. 7A to the first storing state in the second stage of the program cycle.

FIG. 7C schematically illustrates associated voltage signals for programming the OTP memory cell FIG. 7A to the first storing state in the second stage of the program cycle. In the second stage of the program cycle, a bit line voltage Vb2 is provided to the bit line BL, the control voltage Vdd1 is provided to the word line WL, the control voltage Vdd2 is provided to the select line SE, and a program voltage Vp2 is provided to the antifuse control line AF. In an embodiment, the bit line voltage Vb2 is 0V, and the program voltage Vp2 is 8V. That is, the program voltage Vp2 is higher than the bit line voltage Vb1, and the bit line voltage Vb1 is higher than the bit line voltage Vb2.

Since the control transistor Tc1 and the control transistor Tc2 are turned on, the bit line voltage Vb2 (e.g., 0V) is transmitted from the first drain/source terminal of the control transistor Tc1 to the first drain/source terminal of the antifuse transistor Taf through the control transistor Tc1 and the control transistor Tc2. Consequently, the voltage at the gate terminal of the antifuse transistor Taf is higher than the voltage at the first drain/source terminal of the antifuse transistor Taf. Under this circumstance, a voltage stress with the positive polarity (+8V) is provided to the region across the gate oxide layer of the antifuse transistor Taf.

Since the voltage stress with the positive polarity (+8V) is largely beyond the withstanding voltage of the antifuse transistor Taf, a program current Ip with the higher magnitude is generated. The program current Ip flows along the pre-established weak path. Consequently, the gate oxide layer of the antifuse transistor Taf is ruptured. Moreover, the program current Ip flows in a second direction. That is, the program current Ip flows from the gate terminal of the antifuse transistor Taf to the first drain/source terminal of the antifuse transistor Taf.

After the two stages of the program cycle are completed, the OTP memory cell is programmed to the first storing state. Moreover, it is confirmed that the ruptured position of the gate oxide layer is arranged between the gate terminal of the antifuse transistor Taf and the first drain/source terminal of the antifuse transistor Taf.

Figure 8A:
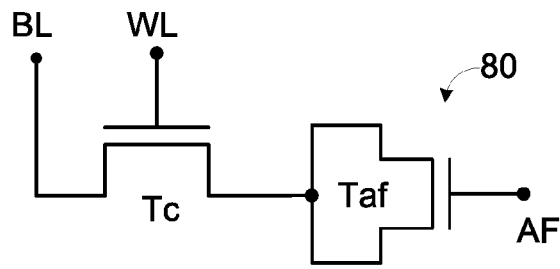
FIG. 8A is a schematic equivalent circuit diagram of an antifuse-type one time programmable memory cell according to a further embodiment of the present invention.

FIG. 8A is a schematic equivalent circuit diagram of an antifuse-type one time programmable memory cell according to a further embodiment of the present invention. The OTP memory cell 80 comprises a control transistor Tc and an antifuse transistor Taf. A first drain/source terminal of the antifuse transistor Taf and a second drain/source terminal of the antifuse transistor Taf are connected with each other. Consequently, the antifuse transistor Taf is formed as a MOS capacitor. A first drain/source terminal of the control transistor Tc is connected with a bit line BL. A gate terminal of the control transistor Tc is connected with a word line WL. The first drain/source terminal of the antifuse transistor Taf is connected with a second drain/source terminal of the control transistor Tc. A gate terminal of the antifuse transistor Taf is connected with the antifuse control line AF.

Figure 8B:
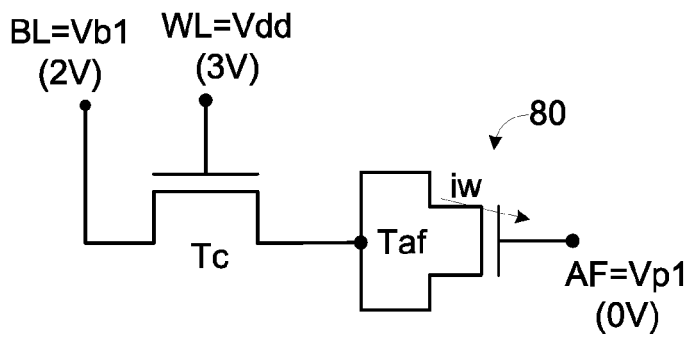
FIG. 8B schematically illustrates associated voltage signals for programming the OTP memory cell FIG. 8A to the first storing state in the first stage of the program cycle.

FIG. 8B schematically illustrates associated voltage signals for programming the OTP memory cell FIG. 8A to the first storing state in the first stage of the program cycle. In the first stage of the program cycle, a bit line voltage Vb1 is provided to the bit line BL, a control voltage Vdd is provided to the word line WL, and a program voltage Vp1 is provided to the antifuse control line AF. In an embodiment, the control voltage Vdd is 3V, the bit line voltage Vb1 is 2V, and the program voltage Vp1 is 0V. That is, the bit line voltage Vb1 is higher than the program voltage Vp1.

Since the control transistor Tc is turned on, the bit line voltage Vb1 (2V) is transmitted from the first drain/source terminal of the control transistor Tc to the first drain/source terminal of the antifuse transistor Taf through the control transistor Tc. Under this circumstance, a voltage stress with the negative polarity (−2V) is provided to the antifuse transistor Taf. In other words, under the above bias condition of the first stage, there will be a localized oxide damage region generated in the gate oxide layer of the antifuse Taf to form the weak path. In addition, a weak path is formed on the gate oxide layer of the antifuse transistor Taf.

Since the first drain/source terminal of the antifuse transistor Taf and the second drain/source terminal of the antifuse transistor Taf are connected with each other, the weak path is formed between the gate terminal of the antifuse transistor Taf and the first drain/source terminal of the antifuse transistor Taf or between the gate terminal of the antifuse transistor Taf and the second drain/source terminal of the antifuse transistor Taf. In the embodiment of FIG. 8B, the weak path is formed between the gate terminal of the antifuse transistor Taf and the first drain/source terminal of the antifuse transistor Taf. In addition, a weak current iw in a first direction flows through the weak path. The weak current iw flows from the first drain/source terminal of the antifuse transistor Taf to the gate terminal of the antifuse transistor Taf.

Figure 8C:
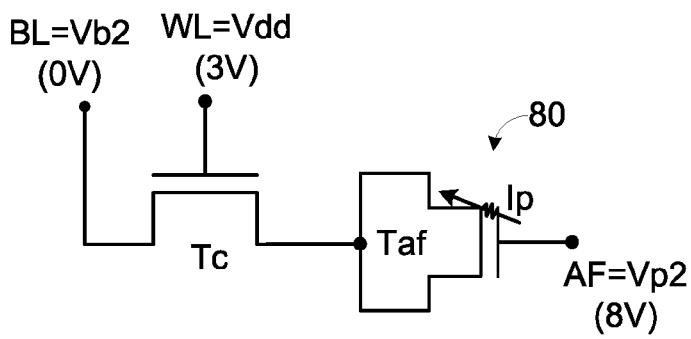
FIG. 8C schematically illustrates associated voltage signals for programming the OTP memory cell FIG. 8A to the first storing state in the second stage of the program cycle.

FIG. 8C schematically illustrates associated voltage signals for programming the OTP memory cell FIG. 8A to the first storing state in the second stage of the program cycle. In the second stage of the program cycle, a bit line voltage Vb2 is provided to the bit line BL, the control voltage Vdd is provided to the word line WL, and a program voltage Vp2 is provided to the antifuse control line AF. In an embodiment, the bit line voltage Vb2 is 0V, and the program voltage Vp2 is 8V. That is, the program voltage Vp2 is higher than the bit line voltage Vb1, and the bit line voltage Vb1 is higher than the bit line voltage Vb2.

Since the control transistor Tc is turned on, the bit line voltage Vb2 (e.g., 0V) is transmitted from the first drain/source terminal of the control transistor Tc to the first drain/source terminal of the antifuse transistor Taf through the control transistor Tc1. Under this circumstance, a voltage stress with the positive polarity (+8V) is provided to the antifuse transistor Taf. Moreover, a program current Ip is generated. The program current Ip flows along the pre-established weak path. Consequently, the gate oxide layer of the antifuse transistor Taf is ruptured. Moreover, the program current Ip flows in a second direction. That is, the program current Ip flows from the gate terminal of the antifuse transistor Taf to the first drain/source terminal of the antifuse transistor Taf.

After the two stages of the program cycle are completed, the OTP memory cell is programmed to the first storing state. Moreover, it is confirmed that the ruptured position of the gate oxide layer is arranged between the gate terminal of the antifuse transistor Taf and the first drain/source terminal of the antifuse transistor Taf.

Figure 9:
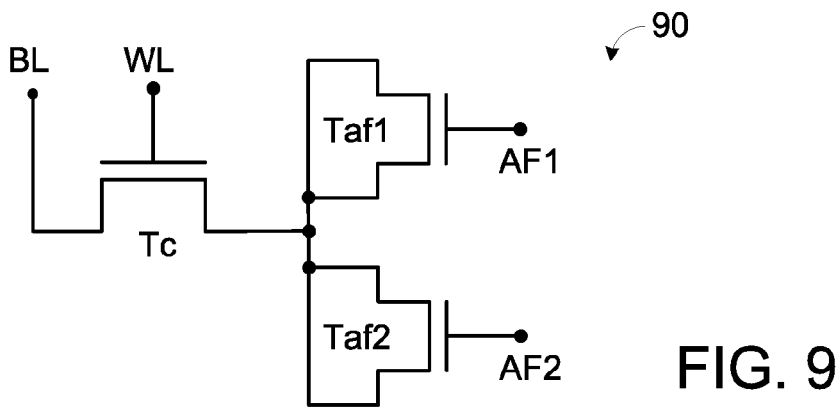
FIG. 9 is a schematic circuit diagram illustrating a variant example of the OTP memory cell of FIG. 8A.

FIG. 9 is a schematic circuit diagram illustrating a variant example of the OTP memory cell of FIG. 8A. In comparison with the OTP memory cell of FIG. 8A, the OTP memory cell 90 of this embodiment comprises a antifuse transistor Taf1 and a antifuse transistors Taf2. Since the OTP memory cell 90 is equipped with the two antifuse transistors, the reliability of the OTP memory cell is enhanced. A first drain/source terminal of the first antifuse transistor Taf1 and a second drain/source terminal of the first antifuse transistor Taf1 are connected with each other. A gate terminal of the first antifuse transistor Taf1 is connected with an antifuse control line AF1. A first drain/source terminal of the second antifuse transistor Taf2 and a second drain/source terminal of the second antifuse transistor Taf2 are connected with each other. A gate terminal of the second antifuse transistor Taf2 is connected with an antifuse control line AF2. The ways of programming the OTP memory cell 90 to the first storing state are similar to those of FIGS. 8B and 8C, and are not redundantly described herein.

From the above descriptions, the OTP memory cell is programmed to the first storing state in two stages during the program cycle. Consequently, it is confirmed that the ruptured position of the gate oxide layer is arranged at the weak path. That is, the ruptured position of the gate oxide layer is arranged between the gate terminal of the antifuse transistor Taf and the first drain/source terminal of the antifuse transistor Taf. Consequently, the possibility of misjudging the storing states of OTP memory cells is largely reduced.

In the above embodiments, the method of programming the OTP memory cell to the second storing state is not described. Since the gate oxide layer of the antifuse transistor Taf in the second storing state is not ruptured, the method of programming the OTP memory cell to the second storing state is similar to that of FIG. 2B. Since the control transistor Tc is turned off, the voltage stress cannot be provided to the gate oxide layer of the antifuse transistor Taf. Under this circumstance, the gate oxide layer of the antifuse transistor Taf is not ruptured.

In the above embodiments, the transistors of the OTP memory cell are N-type transistors (e.g., NMOS transistors). It is noted that the types of transistors used in the OTP memory cell are not restricted. In some other embodiment, the transistors of the OTP memory cell are P-type transistors (e.g., PMOS transistors). Furthermore, It is noted that the voltage signals for programming and reading the OTP memory cell are not restricted. In some other embodiment, other voltage signals may use to program or read the OTP memory cell.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for programming an antifuse-type one time programmable memory cell, the antifuse-type one time programmable memory cell comprising a first control transistor and a first antifuse transistor, the first control transistor comprising a gate terminal, a first drain/source terminal and a second drain/source terminal, the first antifuse transistor comprising a gate terminal and a first drain/source terminal, the first drain/source terminal of the first antifuse transistor being connected with the second drain/source terminal of the first control transistor, the method comprising steps of:

(a) providing a first program voltage to the gate terminal of the first antifuse transistor and turning on the first control transistor, wherein a first bit line voltage is transmitted from the first drain/source terminal of the first control transistor to the first drain/source terminal of the first antifuse transistor, a first voltage stress with a first polarity is provided to a gate oxide layer of the first antifuse transistor, and a weak path is formed between the gate terminal of the first antifuse transistor and the first drain/source terminal of the first antifuse transistor; and (b) providing a second program voltage to the gate terminal of the first antifuse transistor and turning on the first control transistor, wherein a second bit line voltage is transmitted from the first drain/source terminal of the first control transistor to the first drain/source terminal of the first antifuse transistor, a second voltage stress with a second polarity is provided to the gate oxide layer of the first antifuse transistor, and a program current is generated along the weak path, so that the gate oxide layer of the first antifuse transistor is ruptured.

2. The method as claimed in claim 1, wherein a first control voltage is provided to the gate terminal of the first control transistor, so that the first control transistor is turned on.

3. The method as claimed in claim 1, wherein the first control transistor and the first antifuse transistor are N-type transistors, wherein the first bit line voltage is higher than the first program voltage, the second program voltage is higher than the first bit line voltage, and the first bit line voltage is higher than the second bit line voltage.

4. The method as claimed in claim 3, wherein in the step (a), a weak current in a first direction is further generated, and the weak current flows along the weak path and flows from the first drain/source terminal of the first antifuse transistor to the gate terminal of the first antifuse transistor.

5. The method as claimed in claim 4, wherein in the step (b), the program current flows in a second direction along the weak path, and flows from the gate terminal of the first antifuse transistor to the first drain/source terminal of the first antifuse transistor.

6. The method as claimed in claim 1, wherein the first drain/source terminal of the first control transistor is connected with a bit line, the gate terminal of the first control transistor is connected with a word line, and the gate terminal of the first antifuse transistor is connected with a first antifuse control line.

7. The method as claimed in claim 1, wherein the antifuse-type one time programmable memory cell comprises:
- a second control transistor, wherein a first drain/source terminal of the second control transistor is connected with a bit line, and a gate terminal of the second control transistor is connected with a word line;
- the first control transistor, wherein the gate terminal of the first control transistor is connected with a select line, and the first drain/source terminal of the first control transistor is connected with a second drain/source terminal of the second control transistor; and
- the first antifuse transistor, wherein the gate terminal of the first antifuse transistor is connected with a first antifuse control line, and the first drain/source terminal of the first antifuse transistor is connected with the second drain/source terminal of the first control transistor.

8. The method as claimed in claim 1, wherein the first drain/source terminal of the first control transistor is connected with a bit line, the gate terminal of the first control transistor is connected with a word line, the gate terminal of the first antifuse transistor is connected with a first antifuse control line, and the first drain/source terminal of the first antifuse transistor and a second drain/source terminal of the first antifuse transistor are connected with each other.

9. The method as claimed in claim 8, wherein the antifuse-type one time programmable memory cell comprises:
- the first control transistor;
- the first antifuse transistor; and
- a second antifuse transistor, wherein a gate terminal of the second antifuse transistor is connected with a second antifuse control line, a first drain/source terminal of the second antifuse transistor is connected with the second drain/source terminal of the first control transistor, and the first drain/source terminal of the second antifuse transistor and a second drain/source terminal of the second antifuse transistor are connected with each other.

* * * * *